United States Patent
Gureshnik et al.

(10) Patent No.: US 6,792,272 B2
(45) Date of Patent: Sep. 14, 2004

(54) RAPID DECODING OF CONTROL CHANNEL TO DECREASE HANDOFF TIME

(75) Inventors: Eran Gureshnik, Petah-Tikva (IL); Yona Leshets, Zur-Igal (IL)

(73) Assignee: Intel Corporation, Santa Clara, CA (US)

( * ) Notice: Subject to any disclaimer, the term of this patent is extended or adjusted under 35 U.S.C. 154(b) by 534 days.

(21) Appl. No.: 09/753,085

(22) Filed: Dec. 28, 2000

(65) Prior Publication Data

US 2002/0086673 A1 Jul. 4, 2002

(51) Int. Cl.[7] .................................................. H04Q 7/20
(52) U.S. Cl. ...................................... 455/436; 370/331
(58) Field of Search ................................ 455/436, 434, 455/438.1, 437, 407, 408, 418, 426.1, 439, 442, 444, 450, 166.2, 226.4, 226.1, 67.13, 701, 216; 370/331, 332, 333

(56) References Cited

U.S. PATENT DOCUMENTS

| 5,479,410 A | * | 12/1995 | Paavonen | 370/332 |
| 5,822,313 A | * | 10/1998 | Malek et al. | 370/332 |
| 6,108,322 A | * | 8/2000 | Kotzin et al. | 370/333 |
| 2001/0034233 A1 | * | 10/2001 | Tiedemann et al. | 455/436 |

* cited by examiner

Primary Examiner—Charles Appiah
Assistant Examiner—Naghmeh Mehrpour
(74) Attorney, Agent, or Firm—Fish & Richardson P.C.

(57) ABSTRACT

A portion of a traffic channel message is detected and decoded to determine if a rapid handover procedure may be used. A first portion of the traffic channel includes information data and CRC data. The CRC data is decoded, and if the CRC determines the message is valid, the mobile station may proceed directly to handover.

25 Claims, 3 Drawing Sheets

RAPID DECODING OF CONTROL CHANNEL TO DECREASE HANDOFF TIME

TECHNICAL FIELD

This invention relates to wireless communication systems, and more particularly to decreasing handoff time between traffic channels.

BACKGROUND

The use of wireless communication systems is growing with users now numbering well into the millions. One of the popular wireless communications systems is the cellular telephone, having a mobile station (or handset) and a base station. Cellular telephones allow a user to talk over the telephone without having to remain in a fixed location. This allows users to, for example, move freely about the community while talking on the phone.

In a radiotelephone communication system, a communication link via an RF channel is established between a mobile station, or subscriber unit, and a source base station. As a mobile station moves out of range of the source base station, the signal quality will degrade until the communication link would ultimately be broken, or the call "dropped". To avoid loss of the communication link resulting from a dropped call, the communication link is shifted from the source base station to a target base station. This process of making the shift is commonly referred to in the radiotelephone communication area, or cellular communication area as a handover process.

A handover can be defined as a change of channel during a call, either because of degradation of the quality of the RF channel which includes, power level or communication link quality below a certain threshold, or because of the availability of another channel which can allow communication at a lower transmit power, or to prevent a mobile station from grossly exceeding the planned base station boundaries. A handover may occur during a call in progress (e.g. from a traffic channel to a traffic channel), or during the initial signaling during call set-up. The handover may be either from a channel on the source base site to another channel on a target base site or between channels on the source base site.

DESCRIPTION OF DRAWINGS

Features and advantages of the invention will become more apparent upon reading the following detailed description and upon reference to the accompanying drawings.

DETAILED DESCRIPTION

Figure 1:
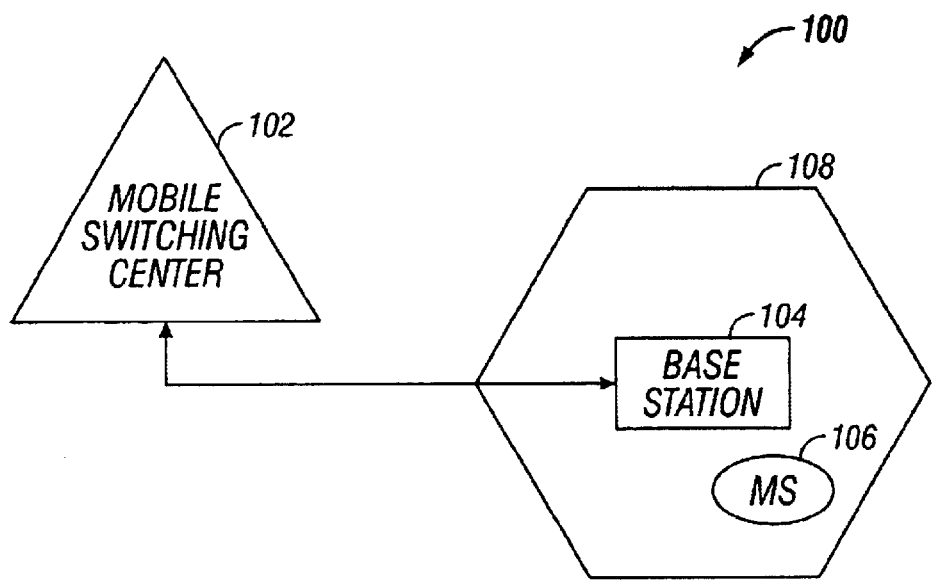
FIG. 1 illustrates components of a wireless communication system appropriate for use with an embodiment of the invention.

FIG. 1 illustrates components of a wireless communication system. A mobile switching center 102 communicates with a base station 104. The base station 104 broadcasts data to and receives data from mobile stations 106 within a cell 108. The cell 108 is a geographic region, roughly hexagonal, having a radius of up to 35 kilometers or possibly more.

The mobile station 106 is capable of receiving data from and transmitting data to a base station 104. Additional cells adjacent to the cell 108 permit mobile stations 106 to cross cell boundaries without interrupting communications.

This is because base stations 104 in adjacent cells assume the task of transmitting and receiving data for the mobile stations 106. The mobile switching center 102 coordinates all communication to and from mobile stations 106 in a multi-cell region, thus the mobile switching center 102 may communicate with many base stations 104.

The mobile stations 106 may move about freely within the cell 108 while communicating either voice or data. The mobile stations 106 not in active communication with other telephone system users may, nevertheless, scan base station 104 transmissions in the cell 108 to detect any telephone calls or paging messages directed to the mobile station 106.

One example of such a mobile station 106 is a cellular telephone used by a pedestrian who, expecting a telephone call, powers on the cellular telephone while walking in the cell 108. The cellular telephone synchronizes communication with the base station 104. The cellular telephone then registers with the mobile switching center 102 to make itself known as an active user within the wireless network.

The mobile station 106 scans data frames broadcast by the base station 104 to detect any telephone calls or paging messages directed to the cellular telephone. In this call detection mode, the mobile station 106 receives, stores and examines paging message data, and determines whether the data contains an identifier matching an identifier of the mobile station 106. If a match is detected, the mobile station 106 establishes a call with the mobile switching center 102 via the base station 104. If no match is detected, the mobile station 106 enters an idle state for a predetermined period of time, then exits the idle state to receive another transmission of paging message data.

Figure 2:
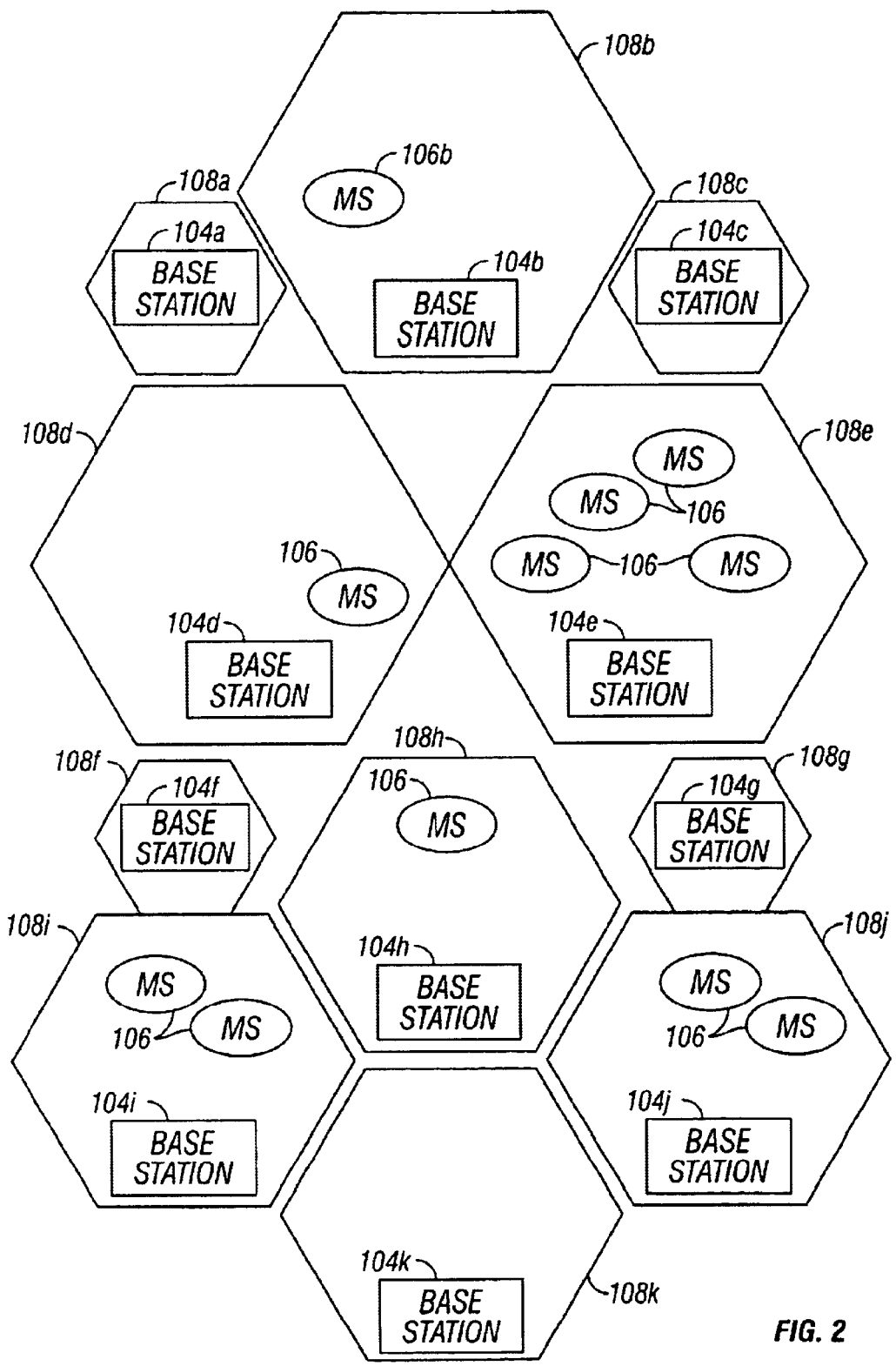
FIG. 2 illustrates a series of cells in a wireless communication system.

FIG. 2 illustrates one example of a series of cells 108a–108k in a wireless communication system. The cells 108a–108k are generally hexagonal, although they may be other shapes including circular, square, oval, oblong, or any other polygon. The size of each cell 108a–108k may vary depending on location. For example, in densely packed urban areas, a cell 108f may be small but in a more rural area the size of a cell 108b increases. Each of the cells 108a–108k has a corresponding base station 104a–104k.

In FIG. 2, the mobile station 106b is located in the cell 108b. While the mobile station 106b is in cell 108b, it is likely being served by the base station 104b, although due to loading and other requirements, it may be served by any base station 104 providing a useable signal. While in one cell 108, the mobile station 106 periodically checks the signal strength of the base stations 104 in each neighboring cell 108. For example, while the mobile station 106b is in the cell 108b, the mobile station 106b monitors the signal strength of base stations 104a, 104c, 104d, and 104e. If the mobile station 106b travels into cell 108e, the mobile switching center 102 may cause the mobile station 106b to handover to base station 104e. In this circumstance, the mobile station 106 then periodically monitors the signal strength of base stations 104b, 104c, 104d, 104g, and 104h.

To travel between the cells 108a–108k, the mobile stations 106 may detect a traffic channel message from neighboring base stations 104. Once the traffic channel message is confirmed, the mobile station 106 may initiate a handover procedure to switch base stations 104.

Figure 3:
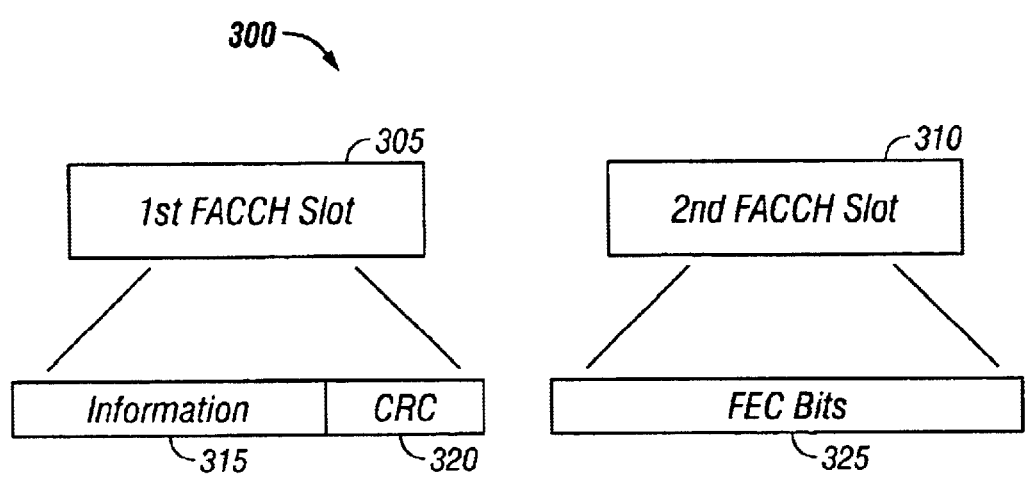
FIG. 3 illustrates a traffic channel message assembly process according to one embodiment of the present invention.

FIG. 3 illustrates a traffic channel message assembly process 300 according to one embodiment. In a Personal Digital Communication (PDC) system, the traffic channel includes a Fast Associated Control Channel (FACCH). The handover time can be decreased by decreasing the decoding time of the FACCH. Handover time is the period from when the mobile station 106 switches from the current traffic channel until synchronization is established with the newly assigned traffic channel. Thus, if the new traffic channel can be decoded quickly, the mobile station 106 can decrease the time require until synchronization, and therefore decrease handoff time.

In the PDC system, the FACCH contains a number of slots 305, 310. Each of these slots 305, 310 includes information that make up the entire FACCH. In the FACCH, each slot 305, 310 has 112 bits of data. The first slot 305 includes information bits 315 and Cyclic Redundancy Check (CRC) bits 320. The second slot 310 includes Forward Error Control (FEC) bits 325. Forward error control (FEC) bits provide the ability to detect and correct digital messages even in the presence of transmission errors. However, if the CRC bits indicate the message was received without error, the FEC bits may be redundant. If the CRC bits do not indicate the message was received without error, the FEC bits may be used to further check the status of the message. Currently, both the CRC bits and the FEC bits and received, extracted, and stored prior to processing any message from the traffic channel.

Figure 4:
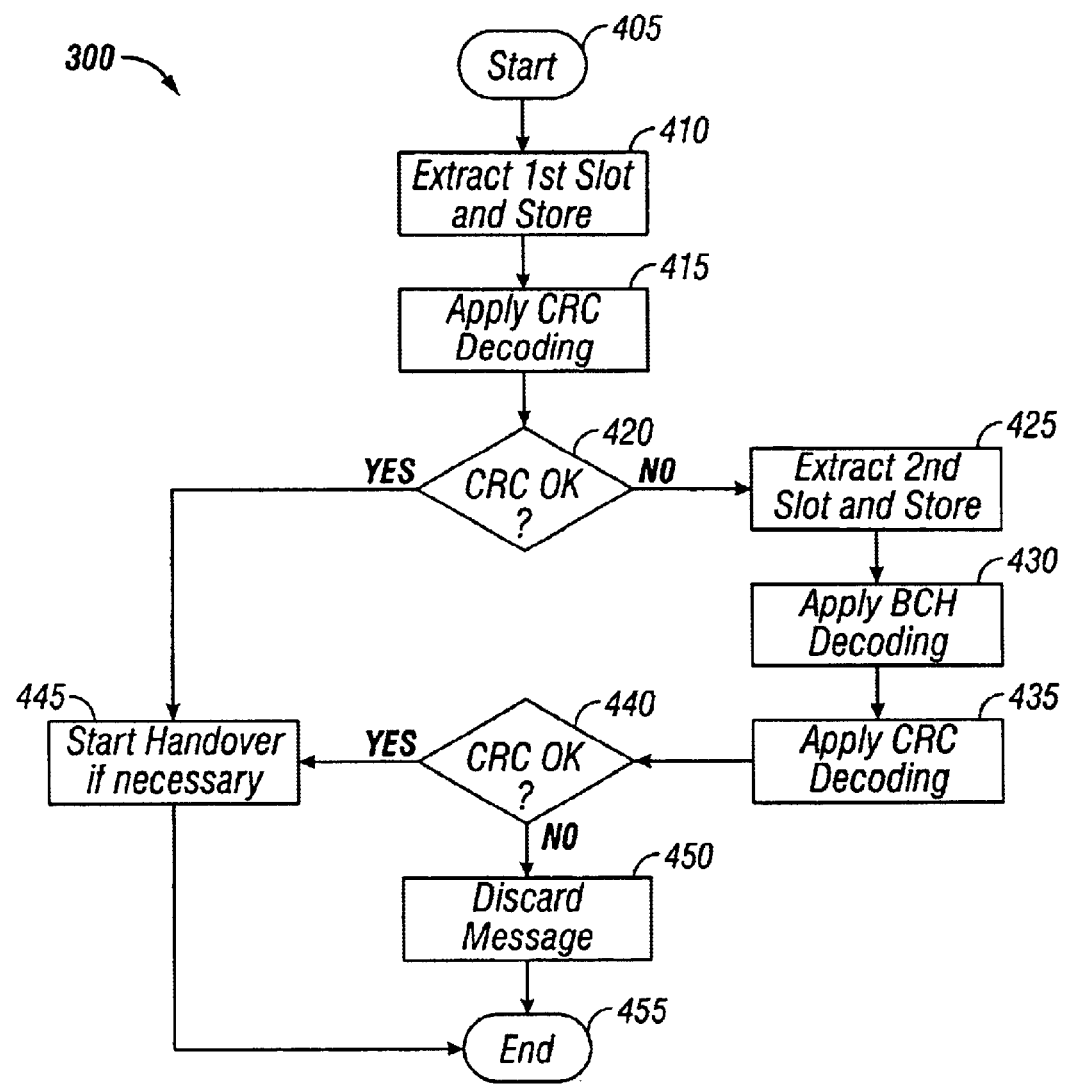
FIG. 4 illustrates a procedure to decode the traffic channel message according to one embodiment of the present invention.

FIG. 4 illustrates a process 400 to decode the traffic channel message according to one embodiment of the present invention. The process 400 begins at a start block 405. Proceeding to block 410, the first slot 305 of the traffic channel message is extracted and stored in bytes. Proceeding to block 415, CRC decoding is applied to the CRC bits 320 in the first slot 320.

Proceeding to block 420, the results of the CRC decoding of block 415 are examined. If the data in the first slot 305 was successfully received, the CRC bits 320 would be intact and the CRC decoding would indicate the decoding was successful. If the CRC decoding is successful, the process 400 proceeds along the YES branch to block 445. In good channel conditions when the bit error rate (BER) is low, the error probability is low. Thus, the chances the CRC decoding will be successful is increased. If the CRC decoding is unsuccessful, the process proceeds along the NO branch to block 425.

In block 425, the second slot 310 of the traffic channel message including the FEC bits 325 is extracted and stored in bytes. Proceeding to block 430, the traffic channel message may be decoded using Bose-Chaudhuri-Hocquengh (BCH) coding. BCH codes are cyclic block codes that are rooted in linear algebra and the properties of those equations. The design of BCH codes may be selected by defining desired coding parameters that may be related directly to overhead and performance. The BCH codes are powerful linear codes for a significant range of block lengths.

Proceeding to block 435, after the traffic channel message is decoded, the CRC decoding is performed a second time. The process 400 then proceeds to block 440 to check the results of the CRC decoding. If the decoding indicates that the traffic channel was received successfully, the process proceeds along the YES branch to block 445. In block 445, the handover process to the new traffic channel may be initiated. The handover process may be directed by the wireless communication network.

Returning to block 440, if the CRC decoding indicates the traffic channel was not successfully received, the process 400 proceeds along the NO branch to state 450. In state 450, the traffic channel message is discarded as unreliable. Following both block 445 and 450, the process terminates in end block 455.

The principles of the present invention which apply to a cellular-based digital communication system also apply to other types of communication systems, including but not limited to personal communication systems, trunked systems, satellite systems and data networks. Likewise, the principles of the present invention which apply to all types of digital radio frequency channels also apply to other types of communication channels, such as electronic data buses, wireline channels, optical fiber links and satellite links Numerous variations and modifications of the invention will become readily apparent to those skilled in the art. Accordingly, the invention may be embodied in other specific forms without departing from its spirit or essential characteristics.

What is claimed is:

1. A method of decreasing handover time in a wireless communication system comprising:

receiving a first traffic channel that is related to handover of communications on the communication system and which includes a first portion with data and a second portion with error control bits;

first checking the validity of second portion of the first traffic channel that includes said error control bits, without checking the content of said first portion with said data; and initiating handover if the said second portion of the traffic channel is valid, and without decoding said data.

2. The method of claim 1, further comprising discarding the traffic channel if the error control bits are determined to be invalid by said first checking.

3. The method of claim 1, further comprising decoding the traffic channel using BCH decoding.

4. A method of initiating handover comprising:

extracting a first slot of a traffic channel;

applying only CRC decoding to the first slot of the traffic channel;

determining the validity of the first slot of the traffic channel based on the CRC decoding; and initiating a requested handover if the CRC decoding indicates that the first slot is valid and prior to decoding data in the first slot.

5. The method of claim 4, further comprising storing the first slot of the traffic channel in bytes.

6. The method of claim 4, further comprising determining if handover is requested.

7. The method of claim 4, further comprising:

extracting a second slot of the traffic channel;

decoding the traffic channel;

determining the validity of the traffic channel based on CRC decoding.

8. The method of claim 7, further comprising discarding the traffic channel if determined invalid.

9. The method of claim 8, further comprising applying BCH decoding to the traffic channel.

10. A mobile station for use in a wireless communication system comprising:

a receiver which receives communication traffic channels including handover information; and an error correcting decoder which decodes only error correction portions within the first slot of the traffic channel to determine validity where said error correcting decoder checks contents of error control bits without checking the content of data associated with said error control bits, and produces a signal that initiates handover of communications from a first slot to a second slot based on the validity of said error control bits.

11. The mobile station of claim 10, wherein the decoder uses CRC decoding.

12. An apparatus, including instructions residing on a machine-readable storage medium, for use in a machine system to handle a plurality of instructions, the instructions causing the machine to:

extract a first slot of a traffic channel;

apply CRC decoding to the first slot of the traffic channel;

determine the validity of the first slot of the traffic channel based on the CRC decoding, and initiate any requested handover if the first slot is valid without detecting content of the data in the first slot.

13. The apparatus of claim 12, wherein the first slot of the traffic channel is stored in bytes.

14. The apparatus of claim 12, wherein the instructions further cause the machine to determine if handover is requested.

15. A method as in claim 1, wherein said error control bits include cyclic redundancy check bits, and said checking the validity includes decoding and verifying said cyclic redundancy check bits.

16. A method as in claim 1, wherein said error control bits include forward error control bits, and said first checking the validity includes decoding and verifying said forward error control bits.

17. A method as in claim 1, further comprising, after said first checking, second receiving a second traffic channel that is also related to handover of communications, said second traffic channel includes a first portion with data related to handover and a second portion with error control bits, and second checking the validity of a second portion of the second traffic channel that also includes error control bits, and wherein said initiating handover occurs only when both said first and second checking indicates a specified amount of error or less.

18. A method as in claim 17, wherein said error control bits in said second portion are different kinds of bits than said error control bits in said first portion.

19. A method as in claim 18, wherein one of said error control bits are cyclic redundancy check bits, and another of said error control bits are forward error control bits.

20. A method as in claim 1, wherein said traffic channel includes a fast associated control channel message.

21. A method as in claim 4, further comprising extracting a second slot of the traffic channel after said determining, and applying a forward error correction coding to the second slot to determine the validity of the second slot, wherein wherein said initiating is carried out only after determining validity of the first slot using the CRC decoding and determining the validity of the second slot using the forward error correction decoding.

22. A station as in claim 10, wherein said error correcting decoder also decodes error correction portions for a second slot, and initiates handover only when said error correction portions of said second slot are also valid.

23. The station as in claim 22, wherein said error correcting decoder decodes a different kind of error correction bits for the first slot than for the second slot.

24. The station as in claim 22, wherein said error correcting decoder uses cyclic redundancy code detection for the first slot and forward error correction for the second slot.

25. An apparatus as in claim 12, further comprising instructions to extract a second slot of the traffic channel after said determine, and apply a forward error correction coding to the second slot to determine a validity of the second slot, wherein wherein said initiate is carried out only after determining validity of the first slot using the CRC decoding and determining the validity of the second slot using the forward error correction decoding.

* * * * *